(12) United States Patent
Makino (10) Patent No.: US 6,259,505 B1
(45) Date of Patent: Jul. 10, 2001

(54) ELECTRO-OPTIC APPARATUS, ELECTRONIC APPARATUS THEREWITH, AND MANUFACTURING METHOD THEREFOR

(75) Inventor: Naoki Makino, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/381,579

(22) PCT Filed: Feb. 1, 1999

(86) PCT No.: PCT/JP99/00437

§ 371 Date: Sep. 22, 1999

§ 102(e) Date: Sep. 22, 1999

(87) PCT Pub. No.: WO99/39239

PCT Pub. Date: Aug. 5, 1999

(30) Foreign Application Priority Data

Jan. 30, 1998 (JP) .............................. P10-020003

(51) Int. Cl.[7] ...................... G02F 1/1339; G02F 1/1333
(52) U.S. Cl. ........................ 349/153; 349/190; 349/154; 349/155; 349/110; 349/111
(58) Field of Search .................... 349/153, 190, 349/154, 155, 110, 111

(56) References Cited

U.S. PATENT DOCUMENTS

| | | | |
|---|---|---|---|
| 5,307,190 | * 4/1994 | Wakita et al. | 359/82 |
| 5,499,127 | * 3/1996 | Tsubota et al. | 359/80 |
| 5,838,482 | * 11/1998 | Decroupet et al. | 359/253 |
| 5,858,482 | * 1/1999 | Ishiwata et al. | 428/1 |
| 5,898,041 | * 4/1999 | Yamada et al. | 522/81 |
| 5,966,194 | * 10/1999 | Hu et al. | 349/153 |
| 5,995,189 | * 11/1999 | Zhang | 349/153 |
| 6,013,339 | * 1/2000 | Yamada et al. | 428/1 |
| 6,151,092 | * 11/2000 | Fujimura et al. | 349/156 |

FOREIGN PATENT DOCUMENTS

| | | |
|---|---|---|
| 3-107124 | 5/1991 | (JP) . |
| 5-15818 | 1/1993 | (JP) . |
| 175140 | * 6/1994 | (JP) . |

OTHER PUBLICATIONS

IBM Technical Disclosure Bulletin vol. 32 No. 7 Dec. 1989 "Seal design for liquid crystal display".*

* cited by examiner

Primary Examiner—William L. Sikes
Assistant Examiner—Mike Qi
(74) Attorney, Agent, or Firm—Oliff & Berridge, PLC (57) ABSTRACT

In an electro-optical apparatus, such as a liquid crystal apparatus using a UV-ray curable sealing member, the remnants of non-cured portions in the sealing member is prevented. The liquid crystal apparatus has a structure in which a UV-ray shielding member or a film member, such as an overcoat formed on an opposing-side substrate and a frame-shaped light shielding member formed on a device-side substrate, is placed within the outer frame portion of the liquid crystal apparatus in an neighboring state to the sealing member. The outer periphery portions of the overcoat and the frame-shaped light shielding member corresponding to the corner portion of the sealing member are formed in a curved shape or a shape having obtuse angles such as an arc. By doing so, a gap between the sealing member and the overcoat, and a gap between the sealing member and the frame-shaped light shielding member, are broadened at the corner portion, so that the sealing member can be prevented from being shielded from UV-rays by the overcoat or the frame-shaped light shielding member, and therefore can be prevented from remaining in a non-cured state.

18 Claims, 8 Drawing Sheets

ELECTRO-OPTIC APPARATUS, ELECTRONIC APPARATUS THEREWITH, AND MANUFACTURING METHOD THEREFOR

BACKGROUND OF THE INVENTION

1. Field of the Invention

The present invention relates to an electro-optical apparatus and to a manufacturing method therefor having a structure in which a pair of substrates are bonded together via a sealing member, and also relates to an electronic apparatus using the electro-optical apparatus.

2. Description of Relared Art

In conventional electronic apparatuses such as digital steel cameras, cellular phones, personal digital assistants, personal computers, and monitors therefor, electro-optical apparatuses such as liquid crystal apparatuses and plasma display panels are widely used for displaying visible images such as numerals, characters, etc. These electro-optical apparatuses are generally formed in a panel structure in which a pair of substrates are bonded together via a roughly frame shape sealing member. A conventional liquid crystal apparatus is usually formed in a rectangular shape and in this case the sealing member has four comer portions. The bonding of the pair of substrates is achieved by curing the sealing member. As a curing method therefor, for example, UV-rays are irradiated on the sealing member.

In a conventional liquid crystal apparatus, a color filter is formed on the surface of one of the pair of substrates and a overcoat is usually formed on the color filter. The overcoat may be called a "topcoat" or an "insulating coat", and the main purposes thereof are flattening of the color filter surface and electrical insulation between the color filter and an electrode formed thereon. Since the overcoat is relatively thickly formed, it functions as a UV-ray shielding member which prevents UV-rays from passing through.

In order to prevent illuminating rays irradiated from the outside of one of the substrates from leaking to the side of the other substrate, a frame-shaped light shielding member may be formed, adjacent to the sealing member, on the surface of the opposing substrate to the substrate on which the above-mentioned overcoat is formed. The frame-shaped light shielding member is usually formed of a metal such as Cr (chromium). It is usually the case that the frame-shaped light shielding member is a UV-ray shielding member that prevents UV-rays from passing through.

As for the electro-optical apparatus such as the liquid crystal apparatus, it is recently required that the overall size be reduced. In particular, reduction in size is required for the outer-frame area, which does not contribute to the display, located outside of a viewing area where visible images such as characters are displayed.

Since the above-mentioned sealing member, the outer periphery of the overcoat, and the frame-shaped light shielding member are included in the aforementioned outer-frame area, reducing the outer-frame area results in reducing the distance between the sealing member and the overcoat, and the distance between the sealing member and the frame-shaped light shielding member.

Generally, UV-rays for curing the sealing member are irradiated from the side of the substrate on which the color filter is formed, that is, the substrate on which the overcoat is coated. Since the overcoat generally is a UV-ray shielding member, when the distance between the sealing member and the overcoat is reduced by reducing the outer-frame area of the liquid crystal apparatus as described above, the UV-rays irradiated from outside of the substrate are not sufficiently supplied to the sealing member, shielded by the overcoat so that the sealing member is not sufficiently cured. This results in degradation of the liquid crystal apparatus by the reaction between the non-cured portion of the sealing member and the liquid crystal.

In view of the other substrate opposing to the substrate on which the color filter is formed, when the outer-frame area of the liquid crystal apparatus is reduced, the distance between the sealing member and the frame-shaped light shielding member, both included in the outer-frame area, is also reduced. Assuming that the sealing member and the frame-shaped light shielding member overlap at a position, the sealing member protrudes onto the surface of the frame-shaped light shielding member and may further extend along the surface toward the inside of the liquid crystal apparatus. If the sealing member extends toward the inside in this manner and enters into the region where the overcoat formed on the opposing substrate exists, when UV-rays are irradiated from the overcoat side, the sealing member located in a region behind the overcoat remains in a non-cured state. This also results in degradation by the reaction between the non-cured portion of the sealing member and the liquid crystal.

Figure 10:
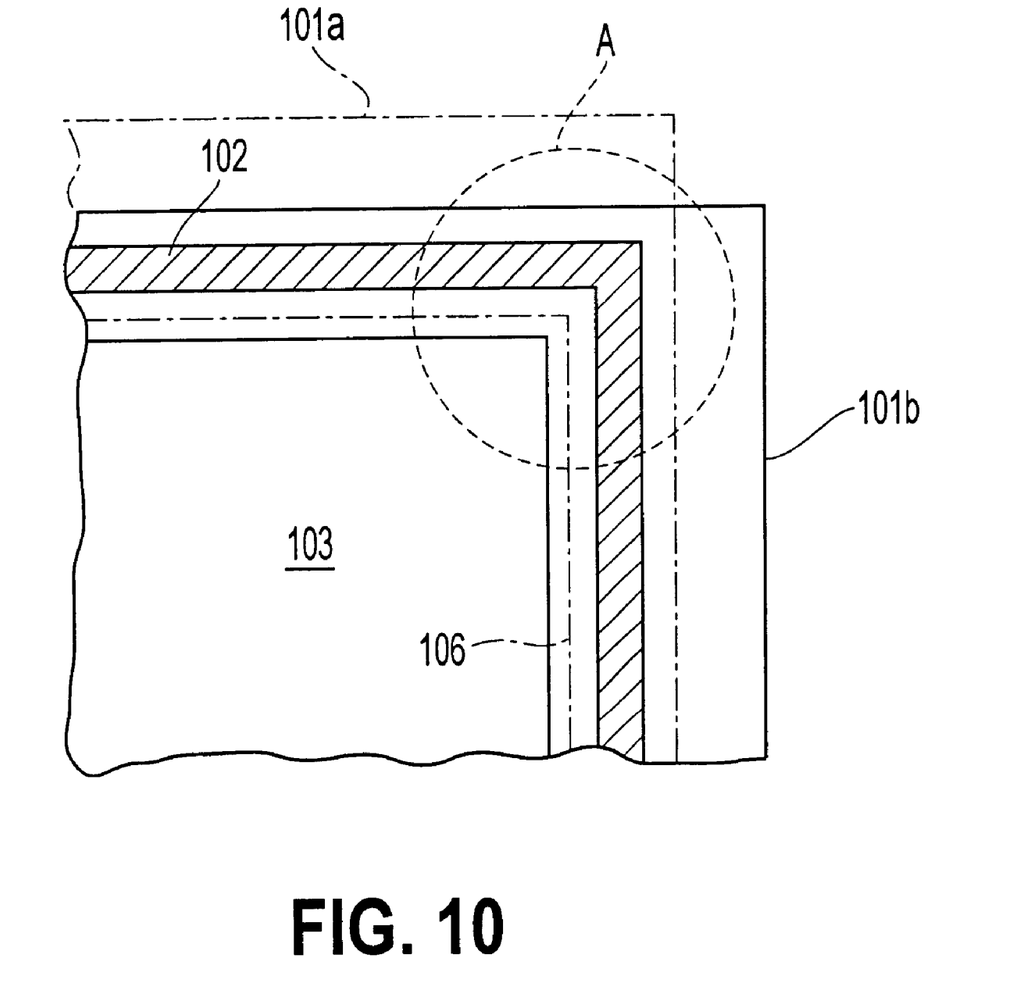
FIG. 10 is a plan view showing an essential part of an example of a conventional electro-optical apparatus.

FIG. 10 shows an enlarged corner portion of the liquid crystal apparatus. As shown in the drawing, it may be a common case that at the comer portion "A" of the sealing member 102, the sealing member 102 more often approaches the overcoat 103 on the substrate 101$b$ on which the overcoat 103 formed thereon, compared with that in the straight portion of the sealing member 102. On the substrate 101$a$ opposing the overcoat-side substrate 101$b$, the sealing member 102 approaches the frame-shaped light shielding member 106 at the comer portion "A" on more occasions than those in the straight portion of the sealing member 102.

The reasons the sealing member 102 approaches the overcoat 103 at maximum at the comer portion "A" and the sealing member 102 approaches the frame-shaped light shielding member 106 at maximum at the same comer portion "A" generally are that, in a conventional liquid crystal apparatus, the comer portions of the overcoat 103 and the frame-shaped light shielding member 106 are pointedly formed in a roughly rectangular shape, and that the sealing member 102 tends to be broad in its width at the comer portion "A".

SUMMARY OF THE INVENTION

In view of the above-mentioned problems, it is an object of the present invention, in an electro-optical apparatus such as a liquid crystal apparatus having a structure in which a UV-ray shielding member or a film member such as an overcoat and a frame-shaped light shielding member is formed adjacent to a sealing member, that the entire sealing member can be securely cured by irradiation of UV-rays to avoid the non-cured portions thereof remaining, even when the outer-frame area of the apparatus is reduced.

(1) In order to achieve the above-mentioned object, an electro-optical apparatus according to the present invention comprises:

a UV-ray curable sealing member having at least one comer portion; a pair of substrates bonded together by the sealing member; and a UV-ray shielding member formed on one of the pair of substrates, wherein the portion of the outer periphery of said UV-ray shielding member corresponding to the comer portion of the sealing member is formed in a curved shape or in a shape having obtuse angles.

In accordance with the above-mentioned configuration of the present invention, when the outer periphery of the UV-ray shielding member corresponding to the comer portion of the sealing member is formed in a curved shape which is not rectangular with sharp comers or in a shape having obtuse angles like a beveled shape, a sufficient gap between the sealing member and the UV-ray shielding member can be provided so that UV-rays directed at the sealing member can be prevented from being blocked by the UV-ray shielding member, resulting in sufficient prevention of any of the sealing member remaining in a non-cured state.

(2) An electro-optical apparatus described in paragraph (1) according to the present invention further comprises a film member formed on the other of the pair of substrates, wherein the portion of the outer periphery of the film member corresponding to the comer portion of the sealing member is formed in a curved shape or in a shape having obtuse angles.

When the film member is formed on the substrate opposing the substrate on the side from which UV-rays are irradiated, the film member approaches the sealing member at maximum at the comer portion of the sealing member. Since the film member is placed opposite to the emitting direction of the UV-rays, it does not directly block the UV-rays; however, it indirectly prevents the UV-rays from being supplied to the sealing member for the following reason.

That is, assuming that the film member is placed too close to the sealing member or that they overlap each other at a location, the sealing member is liable to protrude onto the film member and to extend along the surface toward the inside of the electro-optical apparatus. If the extending sealing member enters into a region in which the UV-ray shielding member formed on the opposing-side substrate exists, when UV-rays are irradiated from the side of the UV-ray shielding member, there may be a danger that the UV-rays are not sufficiently irradiated on the sealing member which is placed at a region shielded behind the UV-ray shielding member. This may result in the non-cured sealing member remaining at that portion.

However, in accordance with the above-mentioned configuration of the present invention, when the outer periphery of the film member placed corresponding to the comer portion of the sealing member is formed in a curved shape which is not rectangular with sharp comers or in a shape having obtuse angles like a beveled shape, and preferably in an arc-shape, a sufficient gap between the sealing member and the film member can be secured at the comer portion, resulting in preventing the sealing member from protruding onto the film member and therefore resulting in preventing the sealing member from entering in a region which is shielded from UV-rays by the UV-ray shielding member formed on the opposing substrate. Accordingly, the remaining of non-cured portions of the sealing member can be prevented.

(3) In an electro-optical apparatus described in paragraph (2) according to the present invention, the film member is a frame-shaped light shielding member formed on the other of the pair of substrates in the outside of a viewing area.

In accordance with the above-mentioned configuration of the present invention, the invention can be applied even when the frame-shaped light shielding member is formed on the other substrate opposing the substrate from which side UV-rays are irradiated. When the outer periphery of the frame-shaped light shielding member is formed in a curved shape, which is not rectangular with sharp comers or in a shape having obtuse angles like a beveled shape, preferably in an arc-shape, a large gap between the sealing member and the film member can be secured at the comer portion so that the sealing member is prevented from protruding onto the frame-shaped light shielding member and therefore resulting in prevention of the sealing member entering in a region which is shielded from UV-rays by the UV-ray shielding member formed on the opposing substrate.

(4) An electro-optical apparatus according to the present invention further comprises a color filter formed on the one of the pair of substrates, wherein the UV-ray shielding member is a overcoat formed on the color filter.

In an ordinary electro-optical apparatus, a color filter may be formed on one of a pair of substrates bonded together by a sealing member. The color filter is used for displaying colored visible images and an overcoat is generally coated thereon.

The outer periphery of the overcoat approaches the sealing member at maximum at the comer portion of the sealing member. Therefore, when UV-rays are irradiated to cure the sealing member from the direction of the substrate on which the overcoat is formed, the comer portion of the sealing member is directly shielded from UV-rays, so that UV-rays are liable to be insufficiently supplied to the sealing member.

However, even when the overcoat functions as a UV-ray shielding member, if the outer periphery of the overcoat is formed in a curved shape, which is not rectangular with sharp comers or in a shape having obtuse angles like a beveled shape in accordance with the present invention, a sufficiently large gap between the sealing member and the overcoat can be secured at the comer portion, so that the sealing member can be prevented from being shielded from UV-rays by the overcoat and therefore can be completely prevented from remaining in a non-cured state.

(5) In an electro-optical apparatus described in paragraph (1) according to the present invention, the UV-ray shielding member is a frame-shaped light shielding member formed on the one of the pair of substrates in the outside of a viewing area.

In accordance with the above-mentioned configuration, even when UV-rays are irradiated from the direction of the substrate on which the frame-shaped light shielding member is formed, if the outer periphery of the frame-shaped light shielding member is formed in a curved shape, which is not rectangular with sharp comers or in a shape having obtuse angles like a beveled shape, a sufficient gap between the sealing member and the UV-ray shielding member can be secured at the comer portion, so that the sealing member can be prevented from being shielded from UV-rays by the UV-ray shielding member and therefore can be completely prevented from remaining in a non-cured state.

(6) In an electro-optical apparatus described in paragraph (4) or (5), the other of the pair of substrates is a device-side substrate having a switching element formed thereon.

In accordance with the above-mentioned configuration, the invention can be applied even to an electro-optical apparatus wherein a switching element is formed on the one of the pair of substrates.

(7) In an electro-optical apparatus described in any one of paragraphs (1) to (6), the curved shape formed at the comer portion of the UV-ray shielding member or the film member may be an arc shape, an ellipsoidal shape, or any free shape.

(8) An electronic apparatus according to the present invention comprises an electro-optical apparatus described in any one of the preceding paragraphs and display and control means for processing display information which is displayed on the electro-optical apparatus. In most cases, the electronic apparatus is used for a visible image display portion of the apparatus, i.e., a portion for displaying numerals, characters and the like. However, it is not limited to the visible image display portion. As electronic apparatuses of this type, there may be mentioned digital steel cameras, cellular phones, and personal digital assistants, for example.

(9) A method for manufacturing an electro-optical apparatus according to the present invention in which a pair of substrates are bonded together via a UV-ray curable sealing member having at least one corner portion, comprises the steps of:

forming a UV-ray shielding member on at least one of the pair of substrates, in which the portion of the outer periphery of the UV-ray shielding member corresponding to the corner portion of the sealing member is formed in a curved shape or in a shape having obtuse angles; and curing the sealing member by irradiation of UV-rays from the side of the one of the pair of substrates after joining the pair of substrates together via the sealing member.

In accordance with the above-mentioned present invention, by forming the portion of the outer periphery of the UV-ray shielding member corresponding to the corner portion of the sealing member in a curved shape which is not rectangular with sharp corners or in a shape having obtuse angles like a beveled shape, a sufficiently large gap between the sealing member and the UV-ray shielding member can be secured at the corner portion, so that the sealing member can be prevented from being shielded from UV-rays by the UV-ray shielding member and therefore can be completely prevented from remaining in a non-cured state.

(10) A method for manufacturing an electro-optical apparatus according to the present invention, in which a pair of substrates are bonded together via a UV-ray curable sealing member having at least one corner portion, comprises the steps of:

forming a UV-ray shielding member on at least one of the pair of substrates, in which the portion of the outer periphery of the UV-ray shielding member corresponding to the corner portion of the sealing member is formed in a curved shape or in a shape having obtuse angles; forming a film member on the other of the pair of substrates, in which the portion of the outer periphery of the film member corresponding to the corner portion of the sealing member is formed in a curved shape or in a shape having obtuse angles; and curing the sealing member by irradiation of UV-rays from the side of the one of the pair of substrates after joining the pair of substrates together via the sealing member.

In accordance with the above-mentioned present invention, by forming the portion of the outer periphery of the UV-ray shielding member formed on the one of a pair of substrates corresponding to the corner portion of the sealing member in a curved shape which is not rectangular with sharp corners or in a shape having obtuse angles like a beveled shape, a sufficiently large gap between the sealing member and the UV-ray shielding member can be secured at the corner portion, so that the sealing member can be prevented from being shielded from UV-rays by the UV-ray shielding member and therefore can be completely prevented from remaining in a non-cured state.

In accordance with the present invention, further by forming the portion of the outer periphery of the film member formed on the other of the pair of substrates corresponding to the corner portion of the sealing member in a curved shape which is not rectangular with sharp corners or in a shape having obtuse angles like a beveled shape, a sufficiently large gap between the sealing member and the film member can be secured at the corner portion, so that the sealing member can be prevented from protruding onto the film member and therefore can be prevented from entering in a region which is shielded from UV-rays by the UV-ray shielding member formed on the opposing substrate. Accordingly, this results in prevention of the sealing member from remaining in a non-cured state.

DESCRIPTION OF THE PREFERRED EMBODIMENTS

A liquid crystal apparatus will be described as an example of an electro-optical apparatus according to the present invention.

Figure 1:
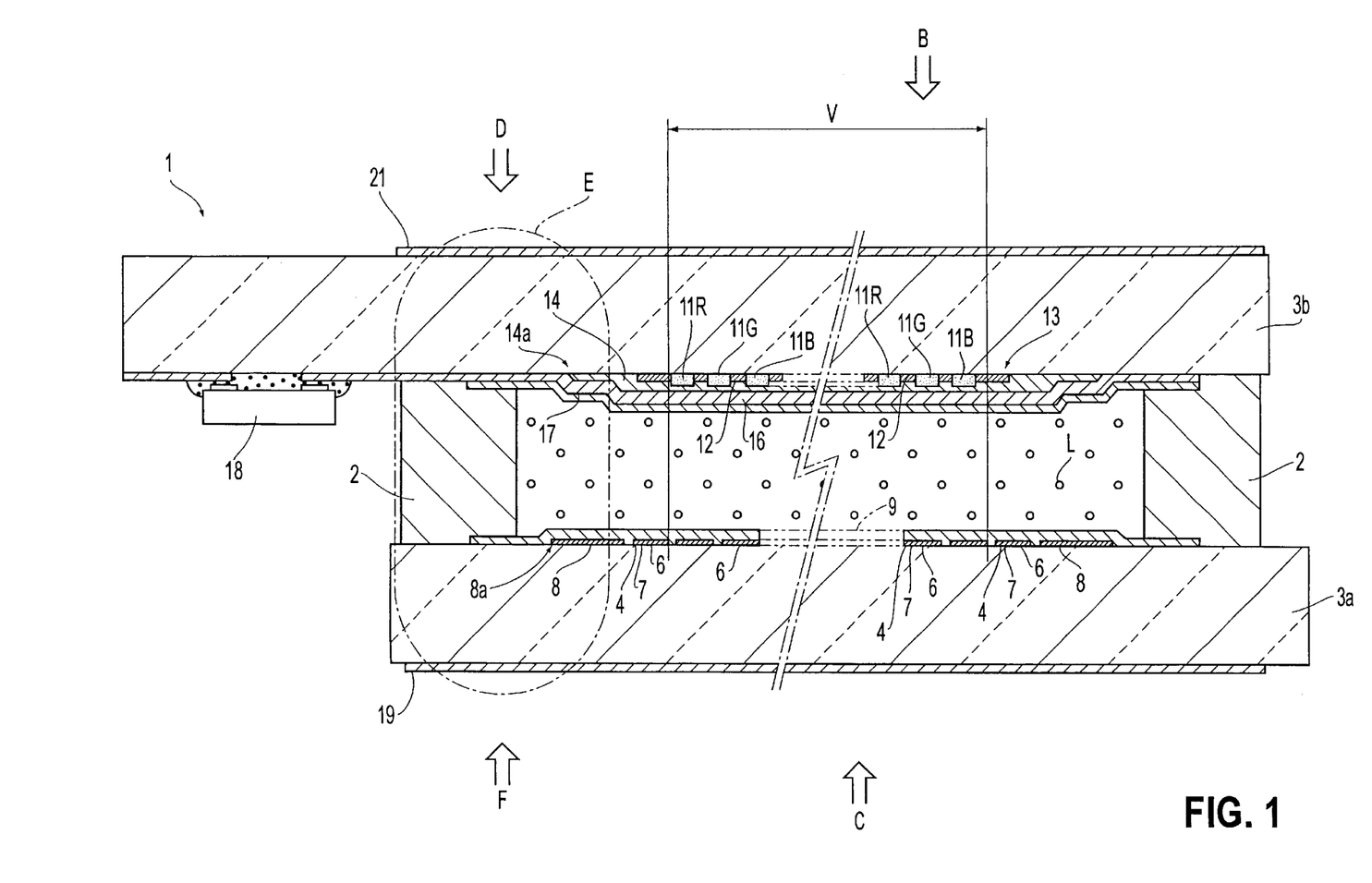
FIG. 1 is a cross-sectional view illustrating a electro-optical apparatus according to a first embodiment of the present invention.

FIG. 1 is a cross-sectional view illustrating a liquid crystal apparatus according to a first embodiment of the present invention. This drawing schematically shows features of the liquid crystal apparatus to facilitate understanding, and thus in this drawing, dimensional proportions of each element configuring the liquid crystal apparatus are different from those of an actual liquid crystal apparatus.

The liquid crystal apparatus shown in this drawing comprises a pair of substrates 3a and 3b bonded together by a sealing member 2 formed in a rectangular loop shape viewed from the direction "B" in the drawing. The substrate 3a shown in a lower side of the drawing is a substrate for a device-side substrate for forming a TFD (Thin Film Diode) as a non-linear device on a surface thereof, while the substrate 3b shown in an upper side of the drawing is a substrate for an opposing-side substrate for forming an opposing electrode on a surface thereof. The device-side substrate 3a and the opposing-side substrate 3b are formed of a material such as a glass or a plastic.

On the inner surface of the device-side substrate 3a, straight wirings arranged in parallel to each other, that is, stripe-shaped wirings 4, are formed, and a plurality of pixel electrodes 6 are further formed between the wirings 4 in a matrix viewed in the direction of the arrow "B". Each pixel electrode 6 is connected to each wiring 4 via a TFD device 7. Each of these elements has a very small size relative to the device-side substrate 3a, and a large number of them are formed on the substrate 3a. However, these elements are shown enlarged in the drawing to facilitate understanding of the structure, and a part of them are omitted, as indicated by chain lines.

A planar region in which elements such as the pixel electrode 6 and the TFD device 7 are formed is surrounded by a light shielding member 8 formed in a generally rectangular or square frame-shape viewed in the direction of the arrow "B". This frame-shaped light shielding member 8 is a light shielding member for preventing illumination light emitted from the direction of an arrow "C" from leaking to the opposite side. On the inner surface of the device-side substrate 3a, an alignment film 9 is formed on the pixel electrode 6, etc., by a material such as a polyimide and to the outer surface of the device-side substrate 3a, a polarizer 19 is further bonded.

Figure 2:
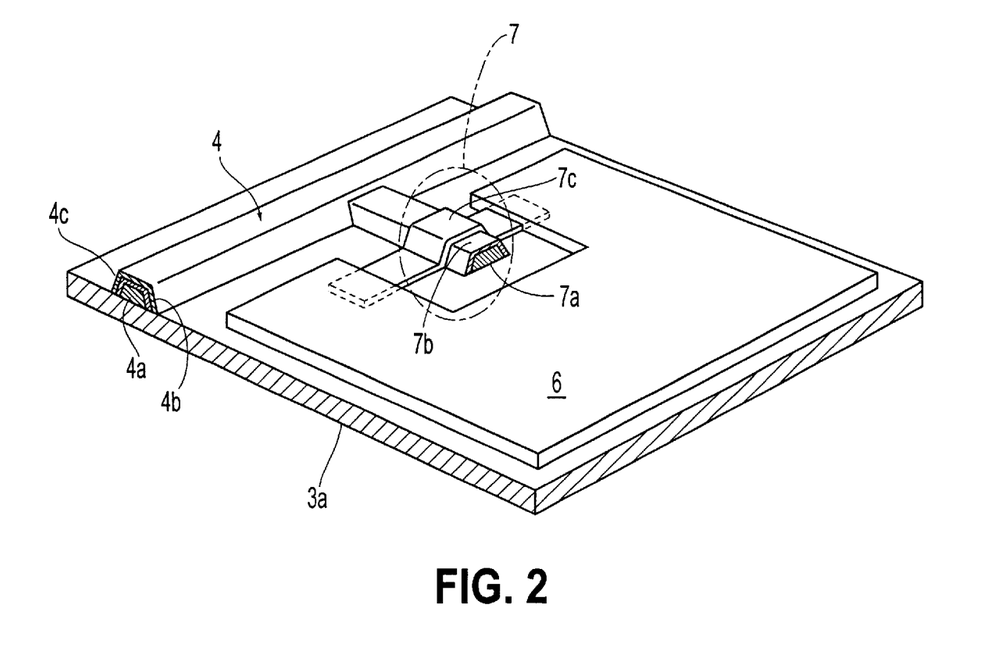
FIG. 2 is a perspective view showing an example of a structure of a TFD device and the vicinity thereof.

The TFD device 7, as shown in FIG. 2, is formed of a first electrode 7a formed on the substrate 3a, an anodic oxidation film 7b, as an insulating layer, formed on the first electrode 7a, and a second electrode 7c formed on the anodic oxidation film 7b. The pixel electrode 6 is formed by a material such as ITO (Indium Tin Oxide) so as to overlap with the second electrode 7c. In a transmissive liquid crystal apparatus, the above-mentioned ITO is used for the pixel electrode 6, while in a reflective liquid crystal apparatus, silver or Al (Aluminum) is used for the pixel electrode 6. In a reflective liquid crystal apparatus, the device-side substrate 3a is not necessarily transmissive and may be of an opaque material such as silicon, provided that an adequately thick oxidation film is formed thereon. Various contacting forms between the pixel electrode 6 and the second electrode 7c are adopted as occasion demands.

The first electrode 7a is formed of a material such as Ta (Tantalum), while the anodic oxidation film 7b is formed of a $TaO_x$ (A Tantalum Oxide). The second electrode 7c is formed of a material such as Cr (Chrome). The frame-shaped light shielding member 8 (FIG. 1) is formed of a material such as Cr simultaneously with the second electrode 7c.

On the other hand, the wiring 4 for transmitting a signal to the TFD device 7 is formed including a first layer 4a formed on the substrate 3a, a second layer 4b formed on the first layer 4a, and a third layer 4c formed on the second layer 4b. The first layer 4a is simultaneously patterned as a conductive pattern for electrifying the first electrode 7a when the oxidation film 7b of the TFD device 7 is formed using an anodic oxidation method. Therefore, the first layer 4a is formed of Ta. The second layer 4b of the wiring 4 is formed of a $TaO_x$ (A Tantalum Oxide) simultaneously with the oxidation film 7b of the TFD device 7.

The third layer 4c of the wiring 4 is patterned at the same time when the second electrode 7c of the TFD device 7 is formed. Therefore, the third layer 4c is formed of Cr. On the third layer 4c, though not shown in the drawing, a wiring may be formed using a material such as ITO by simultaneous patterning when the pixel electrode 6 is formed. The wiring on the third layer 4c is used for a so-called redundant design to maintain overall conduction of the wiring 4 in the event of a wire break in the third layer 4c.

In FIG. 2, an example is shown in which one TFD device comprising the first electrode 7a, the oxidation film 7b, and the second electrode 7c is formed between the pixel electrode 6 and the wiring 4. In addition, in order to symmetrize the volt-ampere characteristics over the range of the positive and negative directions, the TFD device 7 may be formed in a back-to-back structure in which two TFD devices are connected in series in opposite directions.

On the inner surface of the opposing-side substrate 3b shown in FIG. 1, a color filter 13 is formed. The color filter comprises transmissive portions 11R, 11G and 11B for each of the colors R (red), G (green), and B (blue) corresponding to each pixel electrode 6, and a black matrix 12 disposed at the portions between the each transmissive portions and overlapping with the TFD device 7 and the wiring 4 when viewed in plan. The black matrix 12 is formed using metals such as Ta, Cr, Mo (molybdenum), Ni (nickel), Ti (titanium), Cu (copper), and Al (aluminum), resin black (carbon), or laminated transmissive portions for a plurality of colors. Although the black matrix 12 also functions as a UV-ray shielding member, because a portion which is closer to the sealing member 2 in this embodiment is a overcoat 14 which covers the color filter 13 including the black matrix 12, a portion having the potential functioning as a UV-ray shielding member, when the sealing member 2 is formed, is the overcoat 14. When the overcoat is not formed, the black matrix 12 (especially the outer peripheral portion thereof) functions as a UV-ray shielding member. Each of these elements has a very small size relative to the substrate 3b, and a large number of them are formed on the substrate 3b. However, these elements are shown in the drawing schematically enlarged to facilitate understanding of the structure, and are also partially omitted as indicated by chain lines.

The overcoat 14 for securing insulation and flatness, a stripe-shaped opposing electrode 16, and an alignment film 17 are formed on the color filter 13 in that order. As the overcoat 14, transparent insulating materials are used chosen from among inorganic substances such as $SnO_2$, $SiO_2$, $TiO_2$, $Al_2O_3$, and $Ta_2O_5$, and organic substances such as an epoxy resin, a polyimide, and an acrylic resin. The thickness of the overcoat 14 ranges from approximately 1 to 4 μm. Since this thickness is comparatively large compared to the thickness, from 30 to 200 nm, of the opposing electrode 16, UV-rays are difficult to pass through the overcoat 14.

On the overcoat 14, the opposing electrode 16 is formed. The opposing electrode 16 is formed in a stripe-shaped pattern in which one linear electrode extends in the horizontal direction on the plane of the drawing while a plurality of such linear electrodes are aligned parallel with each other in the vertical direction on the plane of the drawing. On the outer surface of the opposing-side substrate 3b, a polarizer 21 is bonded thereto.

On an IC mounting edge of the opposing-side substrate 3b, an IC 18 for driving a liquid crystal is mounted. To the output terminal of the IC 18, each opposing electrode 16 is connected. On the device-side substrate 3a, an IC mounting edge is also formed, on which an IC for driving a liquid crystal is mounted. To the output terminal of the IC, each wiring 4 is connected. Since the IC mounting edge of the device-side substrate 3a is located at the back side of the structure shown in FIG. 1, it is not shown in the drawing. As for the liquid crystal apparatus, in addition to the structure shown in FIG. 1, a control circuit for supplying a driving signal to the IC 18 for driving a liquid crystal and a backlight unit as an illuminator when the liquid crystal apparatus is of a transmissive type, are also formed as needs dictate, which are omitted in the drawing.

As shown FIG. 1, in a region in which the pixel electrode 6 on the device-side substrate 3a planarly overlaps onto the opposing electrode 16 on the opposing-side substrate 3b, a pixel for displaying a visible image is formed. An effective viewing area "V" for displaying visible images such as images, characters, and numerals is set up as a region having an appropriate area within a planar region in which the pixel electrode 6 is disposed. The frame-shaped light shielding member 8 is formed in a frame shape along the outer periphery of the effective viewing area "V" using a material such as Cr or Ta which is a forming material for the TFD device 7, or the same material as that for the above-mentioned black matrix 12. When Ta or Cr is used, it can be formed simultaneously when the TFD device is formed. At this time, outside the effective viewing area "V", the wiring 4 which is not used for display and the TFD device 7 are formed. In patterning of the first layer 4a of the wiring and the first electrode 7a of the TFD or the second electrode 7c of the TFD, by patterning them in the same shape as that of the pixel electrode 6, the frame-shaped light shielding member 8 formed of clusters of matrix-shaped shielding portions may be formed. When the frame-shaped light shielding member 8 is formed of clusters of matrix-shaped shielding portions, the black matrix 12 of the opposing-side substrate 3b and the frame-shaped light shielding member 8 are planarly overlapped so that leaking light between the matrix portions can be shaded.

When the IC 18 for driving a liquid crystal mounted on the opposing-side substrate 3b and the IC for driving a liquid crystal mounted on the device-side substrate 3a (not shown) function, predetermined "ON" and "OFF" voltages are applied across the pixel electrode 6 corresponding to a selected pixel and the opposing electrode 16 such that the alignment of the liquid crystal "L" is controlled by this voltage control. Visible images such as characters, numericals, images, and designs are displayed within the effective viewing area "V" by modulating light depending on this alignment control.

The liquid crystal apparatus 1 formed as described above is manufactured by a method, for example, including the following steps.

First, the TFD device 7, the pixel electrode 6, the wiring 4, and the frame-shaped light shielding member 8 are formed on the device-side substrate 3a, while the color filter 13, the overcoat 14, and the opposing electrode 16 are formed on the opposing-side substrate 3b.

Next, after alignment films 9 and 17 are deposited on both substrates, respectively, alignment treatment such as rubbing is performed.

The sealing member 2 is printed by screen process printing, etc., on the predetermined position of either the device-side substrate 3a or the opposing-side substrate 3b. At this time, a liquid crystal inlet portion is formed in a portion of the sealing member 2. The sealing member 2 is formed of a material containing a UV-ray curable resin having, for example, an epoxy resin as a principal component. The sealing member 2 further includes cylindrical-shaped spacers such as glass fiber and spherical-shaped spacers, which define the clearance between the substrates.

The device-side substrate 3a and the opposing-side substrate 3b are joined and positioned with each other sandwiching the sealing member 2 therebetween, while being adhered so as to have an appropriate gap between the substrates (cell gap). In this state, the sealing member 2 is cured by irradiation of UV-rays of which the intensity is 50 to 100 mW and the time is approximate 60 seconds, for example, depending on the characteristics of a UV-ray curable resin.

In a transmissive liquid crystal apparatus, since both the device-side substrate 3a and the opposing-side substrate 3b have transmissive properties, irradiation of UV-rays may be performed from either substrate side. However, the TFD device 7 is liable to change in its switching characteristics (resistance characteristics), etc., when it is irradiated by UV-rays. Therefore, in order to shield the TFD device 7 and a portion of the wiring 4 from UV-rays by the black matrix 12 formed on the opposingside substrate 3b, it is preferable that irradiation of UV-rays be performed from the side of the opposing-side substrate 3b.

When irradiation of UV-rays is performed from the side of the opposing-side substrate 3b, the following problems may occur. That is, in the portion of the sealing member 2 corresponding to the IC mounting edge on the device-side substrate 3a, a number of the wirings 4 are crossing over the sealing member. Since a number of crossings of the wirings 4 block UV-rays, even when irradiation of UV-rays is performed from only the device-side substrate 3a side, unevenness in the degree of curing of the sealing member 2 occur, probably resulting in non-uniform widths of the sealing member 2 or in partially non-cured portions of the sealing member 2. Accordingly, it is preferable that irradiation of UV-rays be performed from the opposing-side substrate 3b.

A panel structure in which the device-side substrate 3a and the opposing-side substrate 3b are bonded together is formed by the curing process of the sealing member 2. In this embodiment, since the sealing member 2 is sufficiently irradiated by UV-rays, there may be no danger of the sealing member 2 remaining in a non-cured state.

Afterward, liquid crystal L is encapsulated in the small gap between both substrates 3a and 3b, in the so-called "cell gap".

Figure 3:
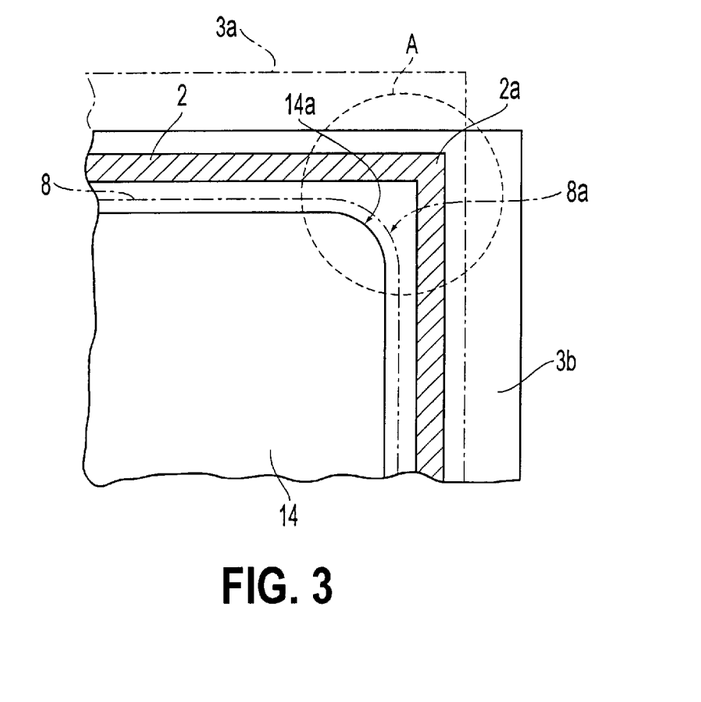
FIG. 3 is a plan view showing the portion designated by numeral "E" of FIG. 1 viewed in the direction of arrow "F".

Description of FIG. 3 showing a substantial part of the liquid crystal apparatus 1 in plan view will be given.

FIG. 3 is a plan view showing the portion designated by numeral "E" of FIG. 1 viewed in the direction of arrow "F", especially enlarged to illustrate the comer portion of the liquid crystal apparatus 1. In this drawing, the device-side substrate 3a and the opposing-side substrate 3b are bonded together overlapped with each other. The outer periphery of the frame-shaped light shielding member 8 formed on the surface of the device-side substrate 3a and the outer periphery of the overcoat 14 formed on the surface of the opposing-side substrate 3b are formed adjacent to the inner periphery of the sealing member 2. In this embodiment, the outer periphery of a comer portion 8a of the frame-shaped light shielding member 8 corresponding to a comer portion 2a of the sealing member 2 is formed in a curved shape, preferably in an arc-shape. The outer periphery of a comer portion 14a of the overcoat 14 corresponding to the comer portion 2a of the sealing member 2 is also formed in a curved shape, preferably in an arc-shape.

The reasons for forming the overcoat 14 and the frame-shaped light shielding member 8 into a curved shape in each comer portion will be described as follows.

As for the overcoat 14, it may be generally formed of a non-transmissive material for UV-rays, ie., a UW-ray shielding member as described above. Therefore, when the overcoat 14 is placed too close to the sealing member 2, and UV-rays are irradiated to the sealing member 2 in the direction of an arrow "D" in FIG. 1, the sealing member 2 is liable to be shielded from UV-rays by the overcoat 14, so that UV-rays are insufficiently supplied to the sealing member 2. This permits insufficient curing of the sealing member 2, resulting in production of degradation caused by a reaction between the non-cured portion of the sealing member 2 and the liquid crystal.

The sealing member 2 tends to broaden in the width direction especially in its comer portions when being sandwiched between the device-side substrate 3a and the opposing-side substrate 3b, while the overcoat 14 is liable to outwardly extend, especially in the comer portion 14a. Accordingly, the sealing member 2 and the overcoat 14 are most liable to approach each other at the portion corresponding to the comer portion 2a of the sealing member 2. Therefore, a non-cured portion of the sealing member 2 is most likely to be produced in a position such as the comer portion 2a.

In this embodiment, as shown in FIG. 3, since the outer periphery of the comer portion 14a of the overcoat 14 is formed in a curved shape, preferably in an arc-shape, a large gap between the comer portion 2a of the sealing member 2 and the comer portion 14a of the overcoat 14 can be formed, so that UV-rays for curing the sealing member 2 can be sufficiently supplied to the sealing member 2, resulting in substantial elimination of remaining the non-cured sealing member 2.

As for the frame-shaped light shielding member 8 in the following, since the frame-shaped light shielding member 8 is placed opposite to the emitting direction of UV-rays, it does not directly block the UV-rays, however, it indirectly prevents the UV-rays from being supplied to the sealing member for the following reason.

That is, if the frame-shaped light shielding member 8 is placed too close to the sealing member 2 or they are overlapped with each other, the sealing member 2 is liable to go up onto the frame-shaped light shielding member 8 and to extend toward the inside of the liquid crystal apparatus 1. If the extending sealing member 2 enters into a region which is shielded by the overcoat 14 on the opposing-side substrate 3b, when UV-rays are irradiated in the direction of the arrow "D", there may be a danger that the UV-rays are not sufficiently irradiated on the sealing member 2 which is placed at a region shielded behind the overcoat 14. This condition may especially occur at the comer portion 2a of the sealing member 2.

In this embodiment, as shown in FIG. 3, since the outer periphery of the comer portion 8a of the frame-shaped light shielding member 8 is formed in a curved shape, preferably in an arc-shape, a large gap between the comer portion 2a of the sealing member 2 and the comer portion 8a of the frame-shaped light shielding member 8 can be formed, resulting in prevention of the sealing member 2 from going up on the frame-shaped light shielding member 8 and therefore resulting in prevention of the sealing member 2 entering in a region in which UV-rays are insufficiently supplied.

In FIG. 1, since an example is illustrated in which UV-rays for curing the sealing member 2 are irradiated from the side of the opposing-side substrate 3b (as shown by the arrow "D"), the overcoat 14 functions as a UV-ray shielding member which directly shields UV-rays, while the frame-shaped light shielding member 8 functions as a film member which indirectly prevents UV-rays from being supplied to the sealing member 2.

In contrast, since the UV-rays may be irradiated from the side of the device-side substrate 3a (as shown by the arrow "F"), in this case, the frame-shaped light shielding member 8 functions as a UV-ray shielding member which directly blocks UV-rays while the overcoat 14 functions as a film member which indirectly prevents UV-rays from being supplied to the sealing member 2.

Figure 4:
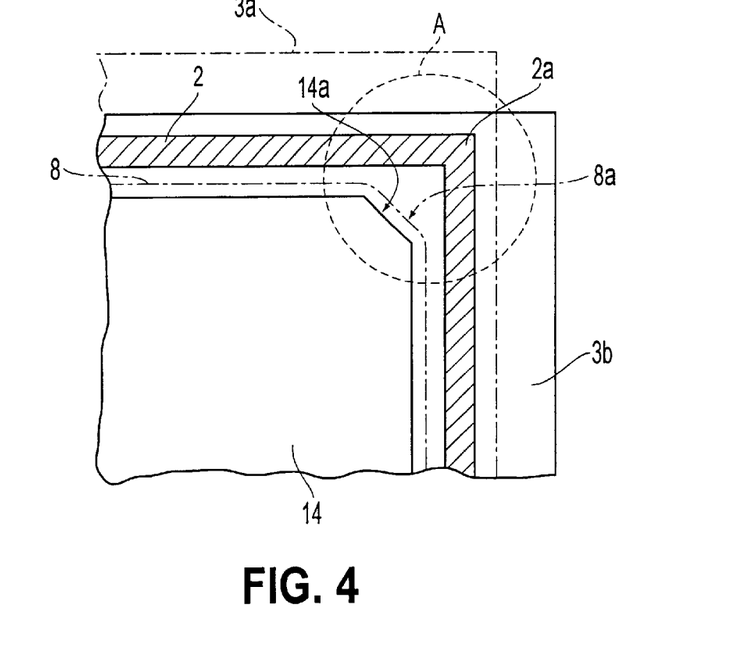
FIG. 4 is a plan view showing a modified embodiment which differs from that shown in FIG. 3.

In the above-mentioned embodiment, while the portion of the UV-ray shielding member corresponding to the comer portion of the sealing member is formed in a curved shape, it is not limited to that shape. For example, it is also effective to form a chamfered shape from a generally rectangular comer, as shown in FIG. 4, and a further chambered comer shape having two or more obtuse angles such a comer shown in FIG. 5.

While in the first embodiment the TFD device is described as an example of a non-linear device forming on the device-side substrate 3a, a TFT device (Thin Film Transistor) may be used as a non-linear device.

Figure 6:
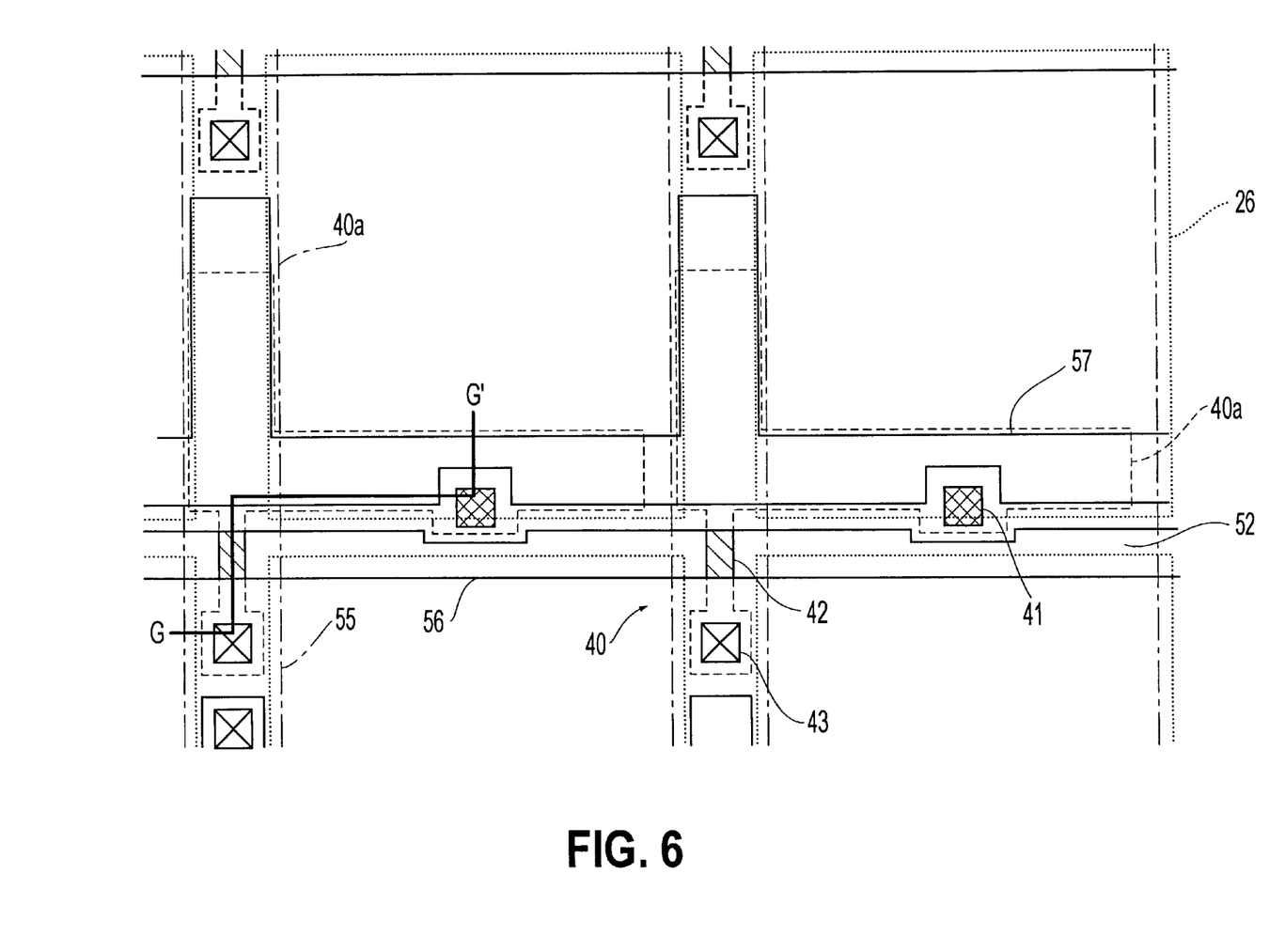
FIG. 6 is a plan view showing an example of a structure of a TFT device and the vicinity thereof.
Figure 7:
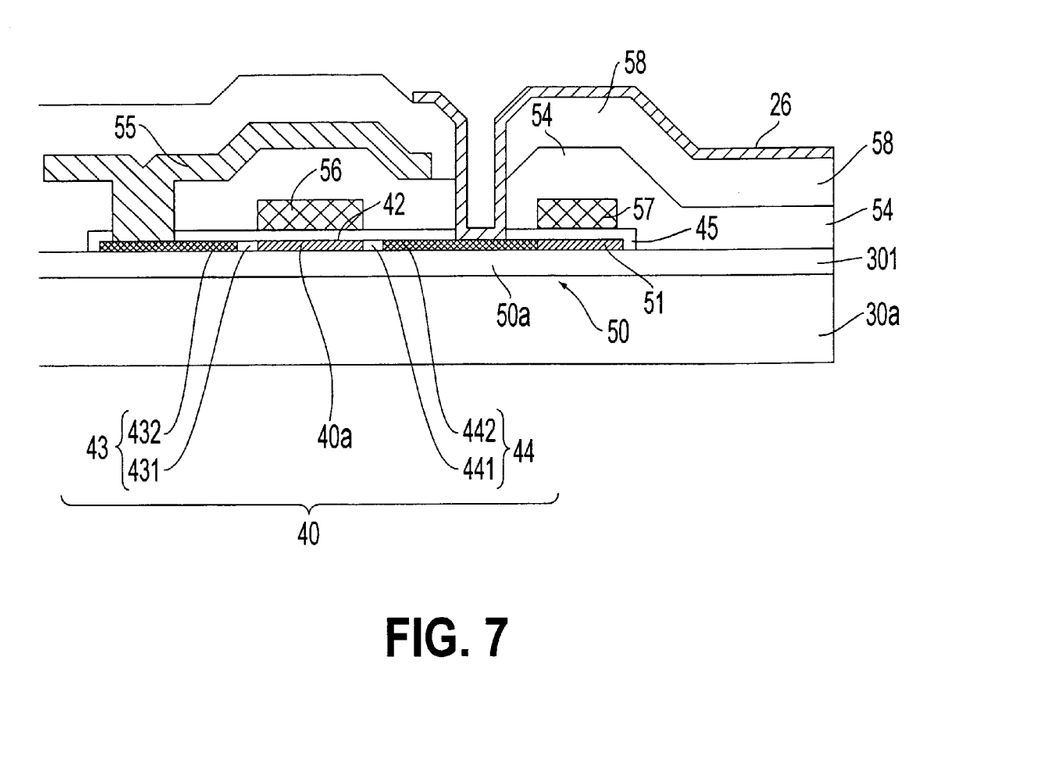
FIG. 7 is a segmentary cross-sectional view at the line G–G' of FIG. 6.
Figure 8A:
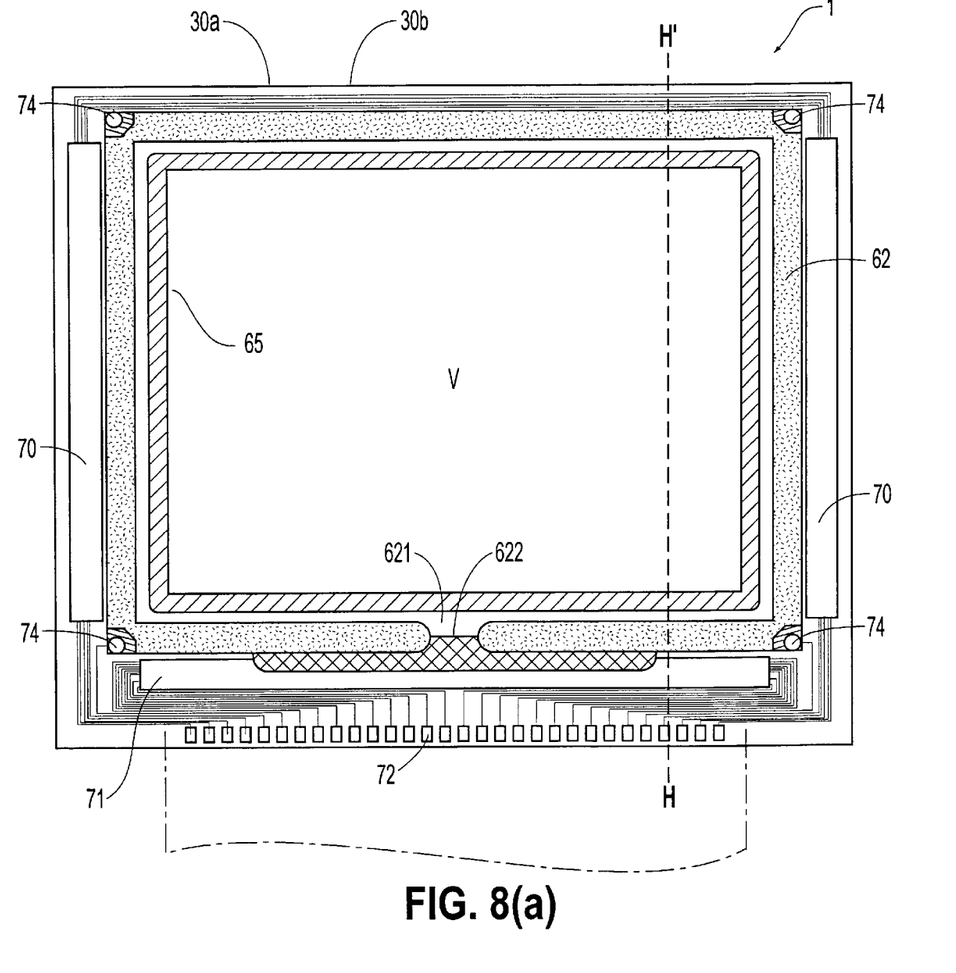
FIGS. 8(a) and 8(b) are plan and cross-sectional views of an electro-optical apparatus according to a second embodiment of the present invention.
Figure 8B:
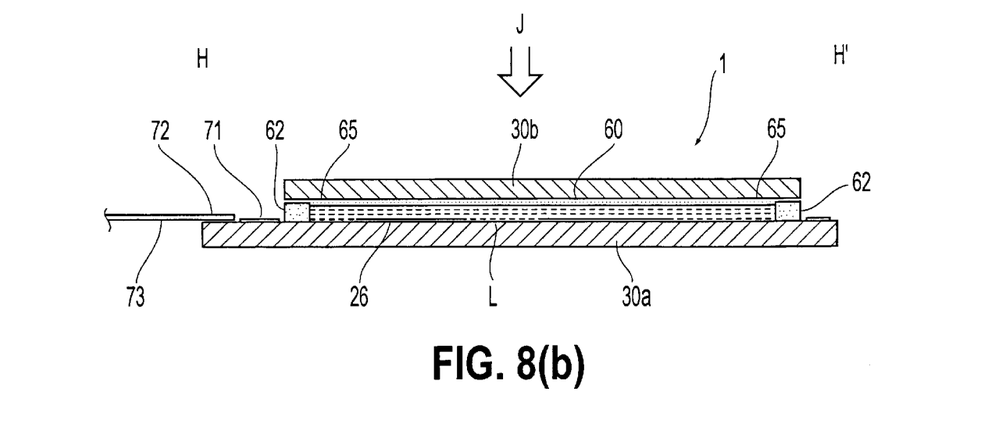

FIG. 6 is a plan view of a liquid crystal apparatus according to a second embodiment of the present invention showing an example structure of a TFT device and the vicinity thereof FIG. 7 is a segmentary cross-sectional view at the line G–G' of FIG. 6. FIG. 8(a) is a schematic plan view of the liquid crystal apparatus having the TFT device, while FIG. 8(b) is a schematic cross-sectional view at the line H–H' of FIG. 8(a).

As shown in FIGS. 6 and 7, a plurality of transparent pixel electrodes 26 are formed in a matrix shape and a data line 55, a scanning line 56, and a capacitor line 57 are formed along a length and width boundaries of the pixel electrode 26. The data line 55 is electrically connected to a source region 43 of semiconductor layers formed of a poly-silicon film, etc., via a contact-hole, while the pixel electrode 26 is electrically connected to a drain region 44 via the contact-hole. The scanning line 56 extends in an opposing arrangement to a channel region 42. A storage capacitor 50 is formed of a lower electrode 51 formed by bringing electrical conduction in a silicon film 50a (a semiconductor layer/diagonally shaded areas in FIG. 6) corresponding to an extended portion of a silicon film 40a (a semiconductor layer/ diagonally shaded areas in FIG. 6) for forming a TFT device 40 for pixel switching, and the capacitor line 57 which is overlapped onto the lower electrode 51 as an upper electrode.

A cross-sectional view in the line G–G' of the pixel region formed in this manner is basically shown in FIG. 7. On the surface of a device-side substrate 30a, island-shaped silicon films 40a and 50a are formed via an underlaid insulating film 301. On the surface of the silicon film 40a, a gate insulating film 45 is formed, on which in turn the scanning line 56 (gate electrode) is formed. Out of a region of the silicon film 40a, the region opposing the scanning line 56 with the gate insulating film 45 sandwiched therebetween is a channel region 42. At one side of the channel region 42 is formed the source region 43 having a low-impurity density source region 431 and a high-impurity density source region 432, while at the other side is formed the drain region 44 having a low-impurity density drain region 441 and a high-impurity density drain region 442. On the top surface of the TFT device 40 for pixel switching formed in this manner, a first innerlayer insulating film 54 and a second innerlayer insulating film 58 are formed. The data line 55 formed on the top surface of the first innerlayer insulating film 54 is electrically connected to the high-density source region 432 via a contact-hole formed in the first innerlayer insulating film 54. The pixel electrode 26 is electrically connected to the high-density source region 432 via contact-holes formed in the first innerlayer insulating film 54 and the second innerlayer insulating film 58. On the silicon film 50a extending from the high-density drain region 442, the lower electrode 51 having a low-impurity density region is formed. The capacitor line 57 opposes the lower electrode 51 through an insulating film (dielectric film) simultaneously formed with the gate insulating film 45. In this manner, the storage capacitor 50 is formed.

Although the TFT device 40 is preferably of the LDD (Lightly Doped Drain) structure as described above, it may be the off-set structure type or may be of a selfaligned type TFT in which high-density source and drain regions are formed in selfalignment by a high-density ionized impurity implantation using the scanning line 56 as a mask.

Referring FIGS. 8(a) and 8(b), the liquid crystal apparatus 1 is generally formed of the device-side substrate 30a on which the pixel electrode 26 and the TFT device (not shown) are formed in a matrix shape, an opposing-side substrate 30b on which an opposing electrode 60 is formed, and liquid crystal sealed and sandwiched between these substrates 30a and 30b. The device-side substrate 30a and the opposing-side substrate 30b are bonded together, being a predetermined gap therebetween, by a sealing member 62 including a gap member formed along the outer periphery portion of the opposing-side substrate 30b. In the inside of the sealing member 62 between the device-side substrate 30a and the opposing-side substrate 30b, liquid crystal "L" is sealed. As the gap member, inorganic or organic fibers or spheres having a size of about from 2 μm to 10 μm are used. As the sealing member 62, a material containing a UV-ray curable resin is used which is the same as described above for the first embodiment.

The sealing member 62 is formed in a manner so as to be partially disconnected, and a liquid crystal inlet portion 621 is formed thereby. The liquid crystal "L" is injected from the liquid crystal inlet portion 621 after the seal member is cured by UV-ray irradiation followed by bonding together of the device-side substrate 30a and the opposing-side substrate 30b by the sealing member 62. Afterward, the liquid crystal "L" is enclosed by plugging the liquid crystal inlet portion 621 by a plugging member 622.

Since the opposing-side substrate 30b is smaller than the device-side substrate 30a, the peripheral portion of the device-side substrate 30a is bonded in a state extending off the outer periphery of the opposing-side substrate 30b. On this periphery portion, driving circuits (scanning line driving circuit 70 and data line driving circuit 71) and input-output terminals 72 are formed. The input-output terminals 72 are connected to a control circuit board which supplies a driving signal to the above-mentioned driving circuits via a FPC (Flexible Printed Circuit) 73, for example. In any of the comer portions of the opposing-side substrate 30b is formed a upper and lower sides conductive member 74 for electrical conduction between the device-side substrate 30a and the opposing-side substrate 30b.

In this embodiment, on the opposing-side substrate 30b, an effective viewing area "V" formed into a frame-shape at inside the sealing member 62 is defined while a shielding film 65 for preventing illumination light emitted from the direction of the device-side substrate 30a from leaking to the opposite side is formed when it is a transmissive liquid crystal apparatus. The shielding film 65 is formed of a material having UV-ray shielding properties such as a metal selected from, for example, Cr (chromium), Ta (tantalum), Mo (molybdenum), Ni (nickel), Ti (titanium), Cu (copper), and Al (aluminum), or resin black (carbon). It is simultaneously formed with the data line 55, the scanning line 56, and a shielding film between pixels, which is a so-called black matrix, for shielding the portion of the TFT device 40, which are shown in FIG. 6. In the liquid crystal apparatus according to this embodiment, the opposing electrode 60 is a common electrode opposing the device-side substrate 30a and is formed on nearly the entire surface of the opposing-side substrate 30b. Since the insulation between the shielding film 65 and the opposing electrode 60 may not be needed for this structure, the overcoat can be eliminated. Accordingly, in this embodiment, the shielding film 65 functions as a UV-ray shielding member.

In the liquid crystal apparatus shown in FIGS. 8(a) and (b), the aforementioned control circuit board and a backlight unit as an illuminating device, when of a transmissive type, may be formed as occasion demands, although this is not shown in this drawing.

In this embodiment, the nearest vicinity of the comer of the sealing member 62, out of the shielding film 65 functioning as a UV-ray shielding member, is formed in a beveled shape from a rectangular comer, having obtuse angles.

Accordingly, when UV-rays are irradiated from the direction of the opposingside substrate 30b as shown by an arrow "J" of FIG. 8(b), a large gap between the shielding film 65 functioning as a UV-ray shielding member and the comer portion of the sealing member 62 can be formed, so that UV-rays for curing the sealing member 62 can be sufficiently supplied to the sealing member 62, resulting in substantial elimination of remaining non-cured sealing member 62.

When a frame-shaped light shielding member corresponding to the shielding film 65 is provided at the vicinity of the sealing member 62 of the device-side substrate 30a although not shown in the drawing, its outer periphery is formed, for example, in a shape having obtuse angles as shown by 8a in FIG. 4 as described in the first embodiment. Accordingly, a large gap between the comer portion of the sealing member 62 and the comer portion of the light shielding member can be formed, which prevents the sealing member 62 from protruding onto the light shielding member. Therefore, this results in preventing the sealing member 62 from entering in a region to which UV-rays are insufficiently supplied, and also in preventing the sealing member 62 from remaining in a non-cured state.

On the other hand, when UV-rays are irradiated from the side of the deviceside substrate 30a, the above-mentioned light shielding member or film member formed on the device-side substrate 30a functions as a UV-ray shielding member. By forming the outer periphery of the light shielding member corresponding to the corner portion of the sealing member 62 in a shape having obtuse angles, the sealing member 62 can be substantially prevented from remaining in a non-cured state.

In the liquid crystal apparatus using the TFT device as in this embodiment, when UV-rays are irradiated from any of the device-side substrate and the opposingside substrate, the sealing member can be prevented from remaining in a non-cured state, if the UV-ray shielding member is formed such that at least the one UV-ray shielding member, which is provided on the substrate from which the UV-rays are irradiated, is formed to have obtuse angles at the portion corresponding to the comer portions of the sealing member.

Figure 5:
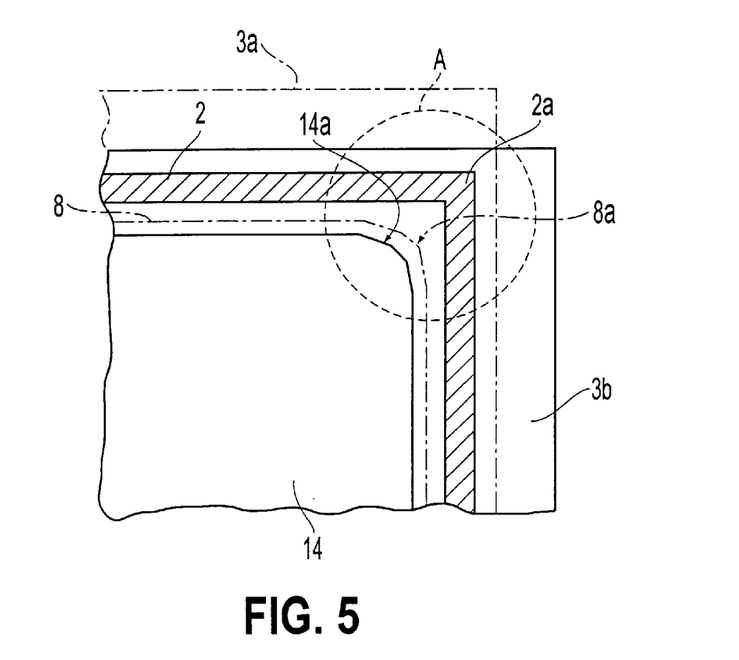
FIG. 5 is a plan view showing still another modified embodiment which differs from that shown in FIG. 3.

Moreover, like the structures previously shown in FIG. 3 or FIG. 5 for describing the first embodiment, it is obvious that the UV-ray shielding member corresponding to the comer portion may be formed in a curved shape or in a shape having three or more angles.

Figure 9:
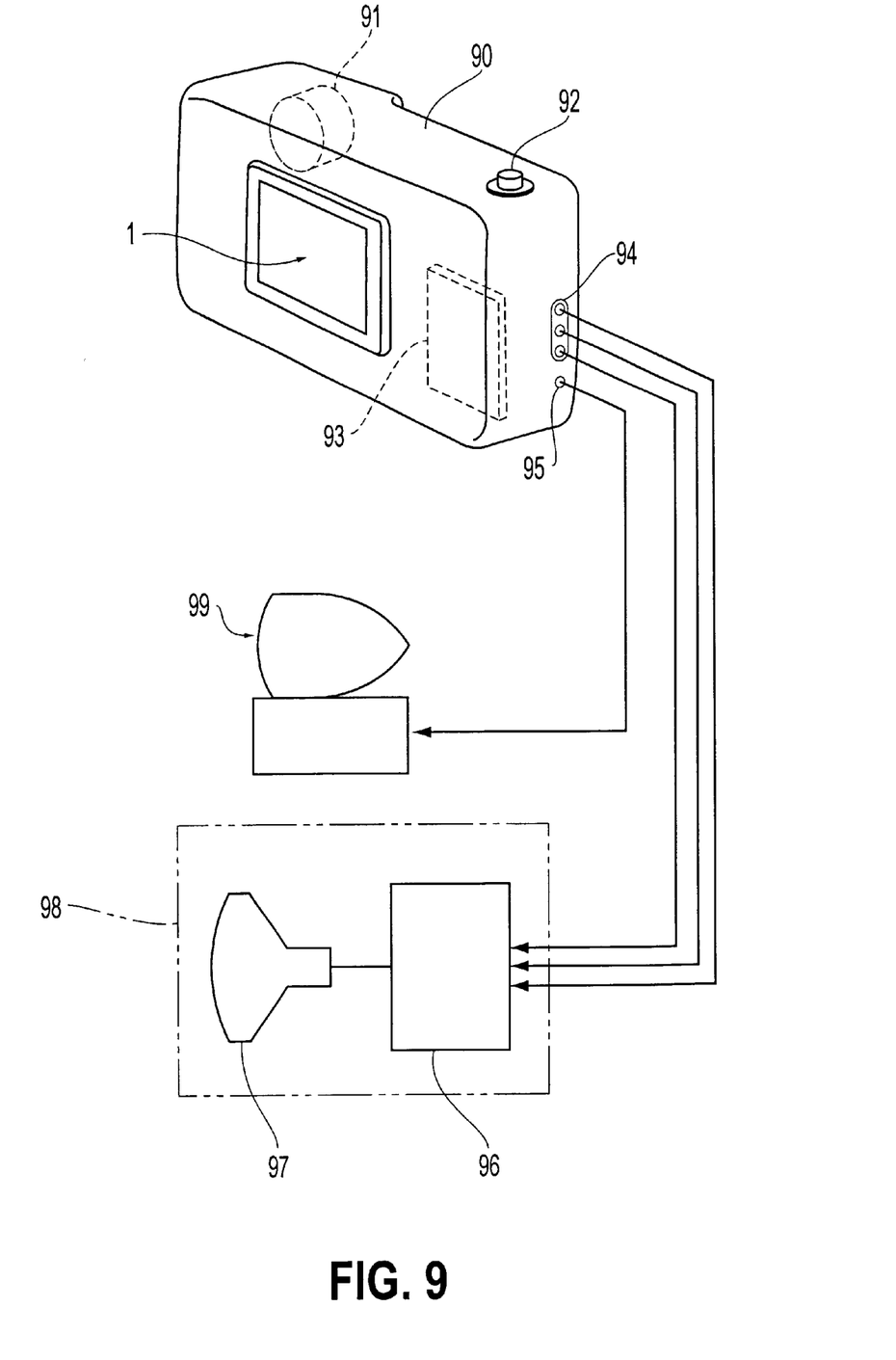
FIG. 9 is a perspective view showing an embodiment of an electronic apparatus according to the present invention.

FIG. 9 illustrates an embodiment of an electronic apparatus according to the present invention. This is an embodiment in which a liquid crystal apparatus, as an example of an electro-optical apparatus according to the present invention, is utilized in a viewfinder of a digital steel camera as an electronic apparatus. In contrast with a conventional camera in which a photosensitive film is exposed to light of an optical image of an object, the digital steel camera produces an imaging signal by photoelectric conversion of an optical image of an object using an imaging device such as a CCD (Charge Coupled Device).

The digital steel camera is formed of units including a receiving unit 91 disposed on the front side of a casing 90, a shutter push-button 92 disposed on the top surface of the casing 90, and a liquid crystal apparatus 1 disposed on the back side of the casing 90. The liquid crystal apparatus 1 functions as a viewfinder for displaying an object and can be formed using a structure, for example, of the liquid crystal apparatus shown in FIG. 1. Within the receiving unit 91, a shutter which is opened and closed corresponding to the shutter push-button 92, optical lenses, and imaging devices such as the CCD device are formed.

The digital steel camera comprises a CPU (Central Processing Unit) for processing display information of a picked up image, etc., and for controlling various functions of the digital steel camera, a circuit board 93 as a control means including memory for storing information, an output terminal 94 for output of a VCR signal, and input-and-output terminals 95 for data communications. Moreover, as occasion demands, a television monitor 98 is connected to the output terminal 94 for output of a VCR signal, and a personal computer 99 is connected to the signal terminals 95. When a picture taker directs the receiving unit 91 at an object, an image of the object is output and displayed on the liquid crystal apparatus 1 by the control of the display control means of the circuit board 93. When the shutter push-button 92 is pushed while the displayed image is checked, an imaging signal corresponding to the object image is output to the output terminal of the acceptance unit 91 with built-in the CCD device, and the output signal in turn is stored in memory on the circuit board 93. The output signal, as occasion demands, is output to the personal computer 99, and a television monitor 98 formed of TV reproduction circuit 96 and a CRT 97. OTHER EXAMPLES Although the present invention is described in connection with preferred embodiments, it is not limited to the embodiments and various modifications may be made in the scope of the invention described in the claims.

For example, although in the first and second embodiments, the so-called active matrix type liquid crystal apparatus using non-linear devices such as TFD and TFT is described, the invention is not limited to this and can also be applied to a passive matrix type liquid crystal apparatus using a UV-ray curable material as a sealing member.

The present invention is not limited to being applied to a liquid crystal apparatus and can also be applied to any structure, as long as a gap is provided between a pair of substrate by bonding a pair of substrates together via a UV-ray curable sealing member. For example, it can be applied to an electro-optical apparatus using a FED (Field Emission Device), or a PDP (Plasma Display Panel).

In accordance with the present invention, since the outer periphery of the UV-ray shielding member such as the overcoat or the frame-shaped light shielding member is formed so that the portion which corresponds to the corner portion of the sealing member has a curved shape or a shape having obtuse angles, a large gap between the UV-ray shielding member and the sealing member can be suffi- ciently obtained. Accordingly, a sufficient amount of UV-rays can be supplied to the sealing member, resulting in improved quality of the electro-optical apparatus using a UV-ray curable material as a sealing member.

What is claimed is:

1. An electro-optical apparatus comprising:

a sealing member having UV-ray curable characteristic and at least one corner portion;

a pair of substrates bonded together by the sealing member; and a UV-ray shielding member formed on one of the pair of substrates, the outer periphery of the UV-ray shielding member being formed so that a portion corresponding to the corner portion of the sealing member is in a curved shape or in a shape having obtuse angles.

2. The electro-optical apparatus according to claim 1, further comprising:

a color filter formed on the one of the pair of substrates, the UV-ray shielding member being a overcoat formed on the color filter.

3. The electro-optical apparatus according to claim 2, the other of the pair of substrates being a device-side substrate having a switching element formed thereon.

4. The electro-optical apparatus according to claim 3, the curved shape being an arc.

5. The electro-optical apparatus according to claim 1, further comprising:

a film member formed on the other of the pair of substrates, an outer periphery of the film member being formed so that a portion corresponding to the corner portion of the sealing member is in a curved shape or in a shape having obtuse angles.

6. The electro-optical apparatus according to claim 5, further comprising:

a color filter formed on the one of the pair of substrates, the UV-ray shielding member being a overcoat formed on the color filter.

7. The electro-optical apparatus according to claim 6, the other of the pair of substrates being a device-side substrate having a switching element formed thereon.

8. The electro-optical apparatus according to claim 7, the curved shape being an arc.

9. The electro-optical apparatus according to claim 5, the film member being a frame-shaped light shielding member formed outside of an effective viewing area on the other of the pair of substrates.

10. The electro-optical apparatus according to claim 9, the curved shape being an arc.

11. The electro-optical apparatus according to claim 9, further comprising:

a color filter formed on the one of the pair of substrates, the UV-ray shielding member being a overcoat formed on the color filter.

12. The electro-optical apparatus according to claim 11, the other of the pair of substrates being a device-side substrate having a switching element formed thereon.

13. The electro-optical apparatus according to claim 1, the UV-ray shielding member being a frame-shaped light shielding member formed outside of an effective viewing area on the one of the pair of substrates.

14. The electro-optical apparatus according to claim 13, the other of the pair of substrates being a device-side substrate having a switching element formed thereon.

15. The electro-optical apparatus according to claim 1, the curved shape being an arc.

16. An electronic apparatus, comprising:
an electro-optical apparatus according to claim 1;
and a display and control device for processing display information which is displayed on the electro-optical apparatus.

17. A method for manufacturing an electro-optical apparatus, in which a pair of substrates are bonded together via a sealing member having UV-ray curable characteristic and at least one corner portion, comprising the steps of:

forming a UV-ray shielding member on at least one of the pair of substrates, in which the UV-ray shielding member is formed so that the portion corresponding to the corner portion of the sealing member is in a curved shape or in a shape having obtuse angles; and curing the sealing member by irradiation of UV-rays from the side of the one of the pair of substrates after joining the pair of substrates together via the sealing member.

18. A method for manufacturing an electro-optical apparatus, in which a pair of substrates are bonded together via a sealing member having UV-ray curable characteristic and at least one corner portion, comprising the steps of:

forming a UV-ray shielding member on at least one of the pair of substrates, in which the UV-ray shielding member is formed so that the portion corresponding to the corner portion of the sealing member is in a curved shape or in a shape having obtuse angles;

forming a film member on the other of the pair of substrates, in which the film member is formed so that the portion corresponding to the corner portion of the sealing member is in a curved shape or in a shape having obtuse angles; and curing the sealing member by irradiation of UV-rays from the side of the one of the pair of substrates after joining the pair of substrates together via the sealing member.

* * * * *